J. A. GILES.
TRANSMISSION DEVICE.
APPLICATION FILED MAY 6, 1915.
1,204,559.
Patented Nov. 14, 1916.
4 SHEETS—SHEET 3.
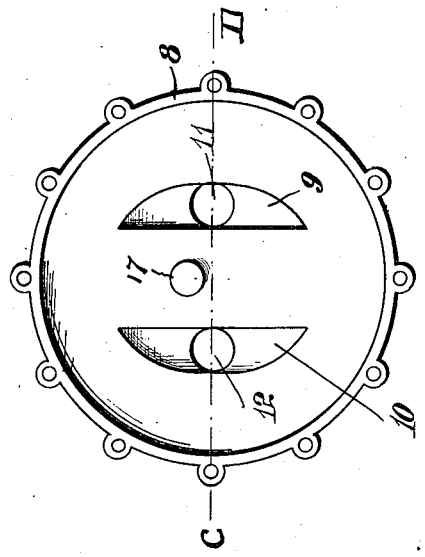
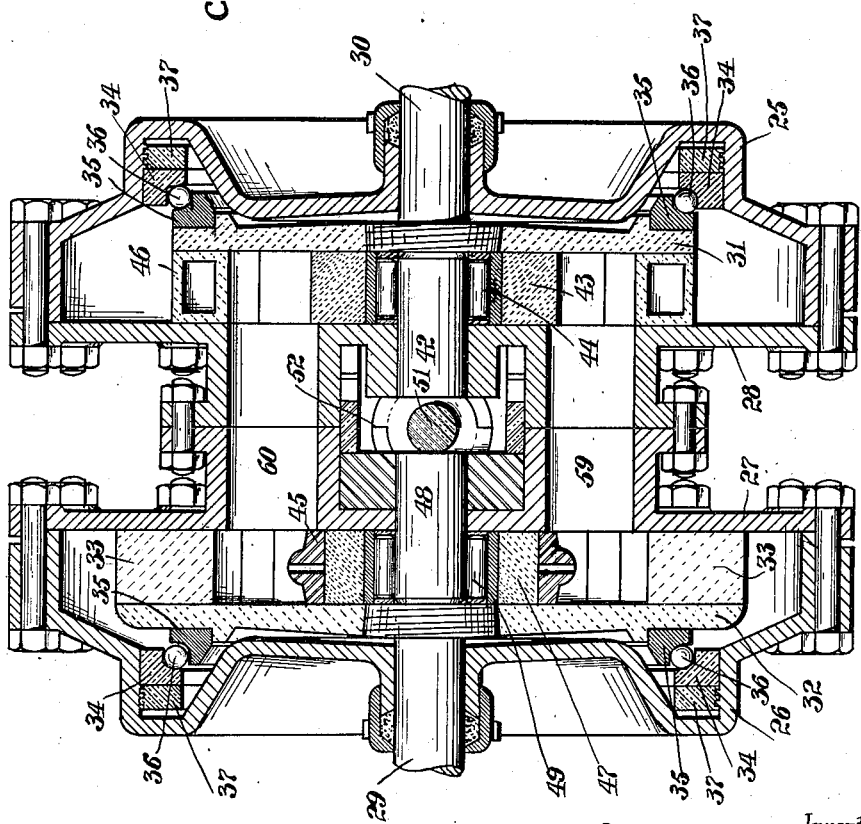
Witnesses:
Inventor:
Julian A. Giles
By
Attorney J. A. GILES.
TRANSMISSION DEVICE.
APPLICATION FILED MAY 6, 1915.
1,204,559.
Patented Nov. 14, 1916.
4 SHEETS—SHEET 4.
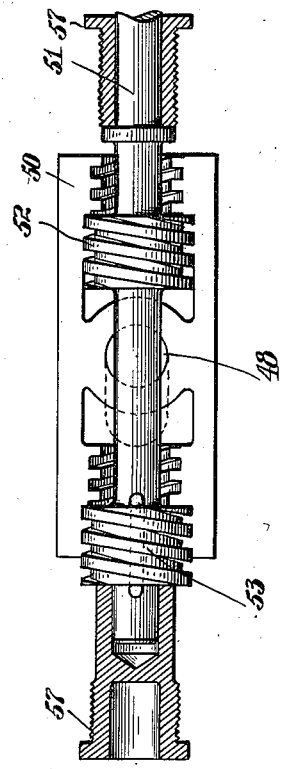
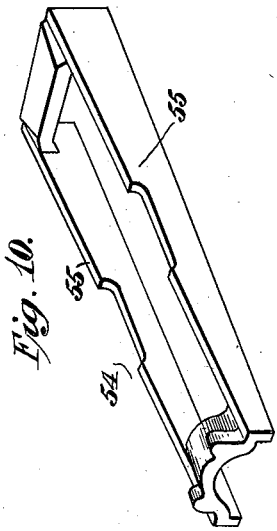
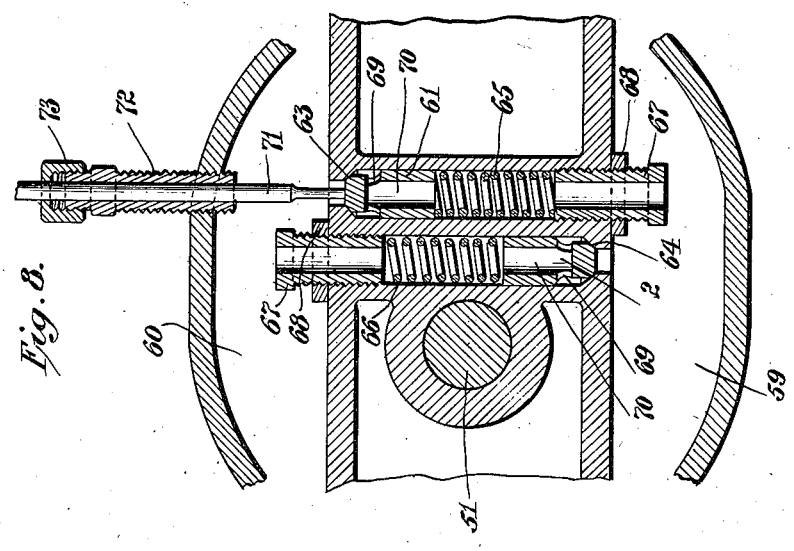
Witnesses:
Inventor
Julian A. Giles
By
Attorney

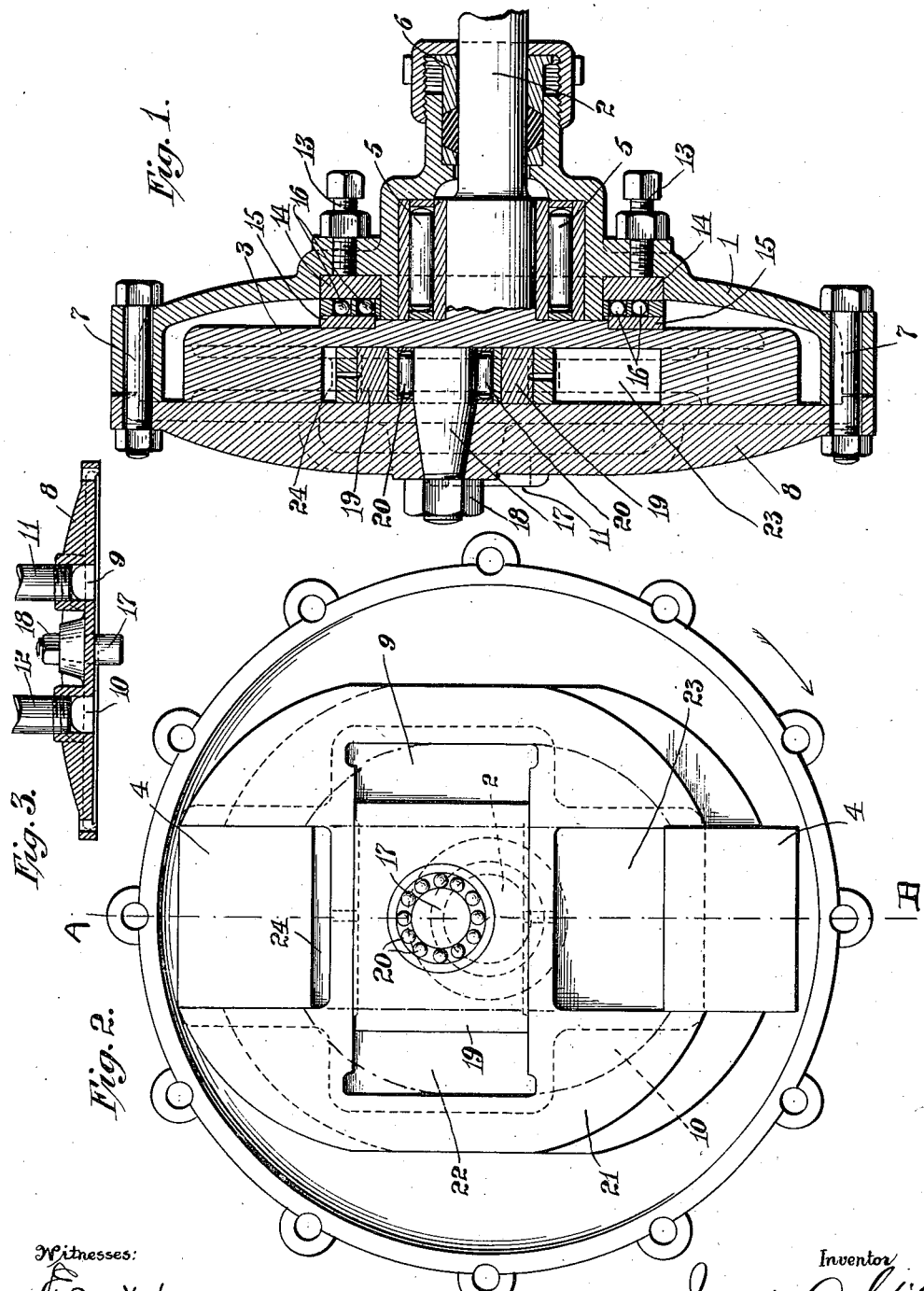

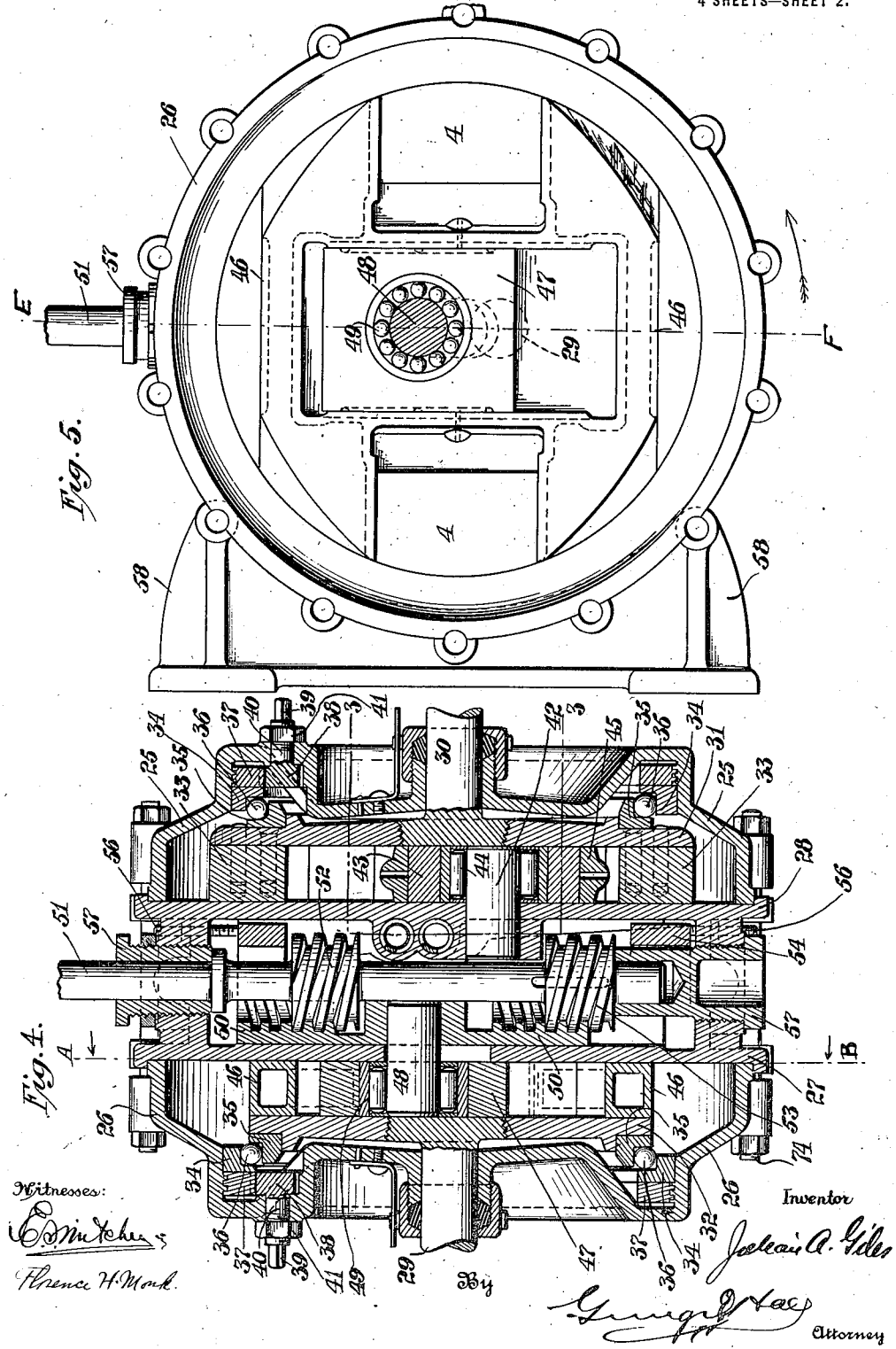

UNITED STATES PATENT OFFICE.

JULIAN A. GILES, OF DERBY, CONNECTICUT.

TRANSMISSION DEVICE.

1,204,559.  Specification of Letters Patent.  Patented Nov. 14, 1916.

Application filed May 6, 1915. Serial No. 26,384.

*To all whom it may concern:*

Be it known that I, JULIAN A. GILES, a citizen of the United States, residing at Derby, in the county of New Haven and State of Connecticut, have invented certain new and useful Improvements in Transmission Devices, of which the following is a specification, reference being had therein to the accompanying drawings.

My invention relates to a new and improved transmission device that may be used as a pump if so desired, and has for its object, among other things, to produce a mechanism of this character that is simple in design and construction, but strong and durable, and not liable to become disarranged or out of repair, will have the maximum efficiency and may be produced at the minimum cost.

To these, and other ends, my invention consists in the improved transmission device, having certain details of construction and combinations of parts, as will be hereinafter described and more particularly pointed out in the claims.

Referring to the drawings, in which like numerals of reference designate like parts in the several figures, Figure 1 is a sectional view of one form of the embodiment of my invention, taken substantially upon line A—B of Fig. 2; Fig. 2 is an elevation of the mechanism shown in Fig. 1 with the cover removed; Fig. 3 is a sectional view of the cover, taken upon line C—D of Fig. 7. Fig. 4 is a sectional view of another form of the embodiment of my invention, taken substantially upon line E—F of Fig. 5; Fig. 5 is an elevation of a portion of the mechanism shown in Fig. 4, taken substantially upon line A—B of Fig. 4; Fig. 6 is a sectional view similar to Fig. 4 but upon a plane at substantially a right angle thereto; Fig. 7 is a face view of the cover; Fig. 8 is an enlarged sectional view of the pressure equalizing mechanism, taken upon line 3—3 of Fig. 4; Fig. 9 is a detail view of the mechanism for adjusting the position of one of the studs; and Fig. 10 is a perspective view of the wedge.

When my mechanism is used as a transmission device it receives initial motion from a constantly rotating primary shaft, and this motion is transmitted through a liquid medium, such as oil, by intermediate mechanism so that the motion thereof is imparted to a driven shaft. Means are provided for varying the relative speed of the driven shaft so that it may rotate at any desired speed, either greater or less than that of the primary shaft, or may be held against rotation without affecting the speed or rotation of the primary shaft. As a transmission device it is adapted for use for motor cars or automobiles, machine tools, propelling vessels, operation of turrets, cranes, hoists, draw bridges, etc., in fact in any place or under any circumstances where power is to be transmitted from a driving element to a driven element.

Referring particularly to Figs. 1, 2 and 3, I have illustrated therein one form of my invention, wherein there is but a single shaft, which may be utilized, either as a driving shaft or as a driven shaft, depending upon the use of the device. If used as a pump the shaft is a driving shaft, if as a motor, it is the driven shaft. In the form illustrated in the other views substantially the same mechanism is shown, but in two units instead of one, in which case it is utilized as a transmission device.

Referring now to the drawings, the numeral 1 designates a cylindrical case or shell, within which is journaled a shaft 2 having a head 3 thereon which is provided with diametrically opposed lugs or blocks 4. As herein shown the shaft 2 and head 3 are made integral with each other, but it is obvious they may be constructed of two independent parts and secured together by any means common to the art.

The shaft 2 is journaled in roller bearings 5, of any preferred construction, and the packing gland 6, also of a common type, is applied to the casing 1 to prevent leakage of liquid therethrough. Fixed to the casing 1 by bolts 7, so as to provide a liquid tight joint, is a cover member having two ports 9 and 10 in the underside thereof. The port 9 is connected with a pipe 11 and the port 10 with a pipe 12 for purposes to be herein described. The head 3 is preferably mounted so that the blocks 4 have a constant sliding contact with the inside face of said cover, this engagement being maintained at the proper pressure against the inside of the cover 8 through a plurality of screws 13 threaded through the case 1 and bearing against a ring 14 between which and a similar ring 15 are a plurality of balls 16, the latter providing an anti-friction bearing. Fixed within the cover 8 eccentric to the axis of the shaft 2, is a stud 17, which is held within said cover against movement by a nut 18 threaded upon the end thereof. In the drawings I have shown this stud as having a tapered portion that fits within a correspondingly tapered recess within the cover, more particularly as shown in Fig. 1, but this is a detail of construction that may be modified if desired. The inner end of the stud 17 projects into the case 1 and lies between the blocks 4 upon the head 3 and journaled thereon is a piston block 19, a ball bearing 20 also being here provided to reduce the friction. This ball bearing may be of any common type and constitutes no part of my present invention. Mounted between the cover 8 and the head 3 is a floating plate 21 having a central opening 22 therein within which the piston block 19 is slidably mounted, and at substantially a right angle thereto are the recesses 23—24, which are substantially the same width as the blocks 4 and having a sliding engagement therewith.

In the construction herein shown and described, the shaft 2 rotates about a fixed axis, which is eccentric to the axis of the stud 17, and the connection between the floating plate 21 and the blocks 4 is such that a rotary movement is imparted to the said plate by the rotation of the shaft 2, and during said rotation the floating plate 21 reciprocates in relation to the blocks by reason of the engagement of the piston block 19 with the opening 22 therein. This compound action causes the floating plate 21 to slide and rotate at one and the same time, and by reason thereof the function of the mechanism is largely performed. By such sliding and rotary movement of the floating plate 21, the extent of the open space varies between the inner end of the block 4 and the bottom of the recesses 23 and 24, as does the open space between the opposite ends of the piston block 19 and the outer edges of the opening 22. While so varying in the extent of the open spaces, the same are passing over the ports 9 and 10. The result is, that while the head 3 rotates there are four chambers or pockets of constantly varying cubic contents that are successively passing over the ports 9 and 10.

Assuming now that the device is being used as a pump and that the head 3 is rotating in the direction of the arrow shown in Fig. 2, the port 9 would be the suction port and the pipe 11 connected therewith the suction pipe, and the port 10 would be the discharge port and the pipe 12 the discharge pipe. It is immaterial so far as the operation of the device is concerned, in which direction the head 3 is rotating, and the direction indicated in Fig. 2 is merely for purposes of illustration. If, however, the head should rotate in the opposite direction, the functions of the ports 9 and 10 would be reversed.

With the parts in the relative position shown in Figs. 1 and 2, the chambers upon the opposite ends of the piston block 19 are one-half their full size and both register with the ports 9 and 10, the one to the right with the suction port 9 and the one to the left with the discharge port 10. Assuming from this position that the shaft 2 begins to rotate, the fluid that passes through the suction pipe 11 and suction port 9 enters the chamber to the right of the piston block 19 and through the rotation of the head and floating plate 21, the size of this chamber increases and with it, of course, the cubic contents, so that the fluid by this action is sucked into said chamber through the suction port 9 and suction pipe 11. This continues until the chamber occupies substantially the same position as the recess 23 in Fig. 2, at which time said chamber has entirely passed over said suction port 9 and a volume of fluid is held therein between the inside of the cover 8 and the face of the head 3. While this operation has been progressing the floating plate 21 has moved by the rotation of the head 3 so that the chamber within the recess 24 has been moved over the suction port 9, the cubic contents of said chamber being gradually increased and fluid enters therein in the same manner as heretofore described for the preceding chamber. When the chamber last referred to has been moved to a position substantially 90° to that shown in Fig. 2, the first described chamber has been moved to a position substantially 180° from its initial position and is now upon the left of the piston block 19, and while moving, during the last 90° of its revolution, its size has been gradually decreased and the fluid therein forced out through the discharge port 10 and discharge pipe 12. During the next 90° of its movement the fluid continues to be forced out of said chamber into the exhaust port 10, until the chamber has been reduced to its minimum, substantially as shown by recess 24 in Fig. 2. These operations are the same with each of the four chambers, they successively taking fluid in from the suction port, carrying it around to the discharge port and then forcing it therethrough. To utilize this device as a motor, the operations are practically reversed, as are the relative functions of the ports 9 and 10. As a motor, the fluid is admitted under pressure through the pipe 12 and a rotary movement is transmitted to the head 3 and shaft 2 connected therewith through the operations heretofore described, except that they are reversed. This mechanism will operate equally as well with air or steam pressure.

In Figs. 4 to 8 inclusive, I have shown my device as adapted to impart movement to a driven shaft from a driving shaft, that is transmit the movement of one shaft to another shaft through a fluid medium, and the mechanism so arranged that the speed of the driven shaft may be varied in relation to that of the driving shaft or it may be held against rotation without affecting the speed of rotation of the driving shaft and can rotate in either direction without changing the direction of rotation of said driving shaft.

Referring particularly to the figures of the drawings last above referred to, I provide two cases 25 and 26, between which is the intermediate casing, constructed in two parts, one being designated by the numeral 27 and the other by the numeral 28. All of these parts are secured together so as to form fluid tight joints therebetween. In each of the casings 25 and 26 is rotatably mounted a shaft 29 and 30, to which is fixed the heads 31 and 32, having blocks 33 connected therewith.

The general construction of the shafts, heads and blocks, just described, is substantially the same as those shown in Figs. 1 and 2, and perform substantially the same function, and the members 27 and 28 of the intermediate casing occupying substantially the same relation thereto as the cover 8 in the same figures. The blocks 33 are held with a sliding engagement against the inside faces of the members 27 and 28 by ball bearing rings 34 and 35, between which are a plurality of balls 36 and pressure rings 37 having a threaded engagement with the inside of the casings 25 and 26. The pressure ring 37 is rotated, and by such rotation moved toward and away from the heads 31 and 32 so as to vary the frictional engagement of the blocks 33 with the members 27 and 28 by a pinion 38 having a toothed engagement with the inside of said ring and rotated by a wrench attached to the head 39 of the stud 40 preferably integral with said pinion. This pinion is secured against rotation and thus holds the ring 37 in any desired position by the nut 41 that is threaded upon the stud 40.

Fixed in the member 28, eccentric to the axis of the shaft 30, is a stud 42 which projects into the open space between the blocks 33, and upon which there is mounted a piston block 43, having an anti-friction bearing 44 therebetween, this latter being of a common type and constitutes no part of my present invention. Connected with said piston block 43 is a floating plate 45, the block 43 and plate 45 being of substantially the same shape and construction as the block 19 and plate 21, and having substantially the same operation and function.

The mechanism connected with the shaft 29, that is, the head, floating plate, etc., is substantially the same as that connected with the shaft 30, but in a position at substantially 90° from that shown in connection with the shaft 30. This latter floating plate is designated by the numeral 46, the piston block by the numeral 47 and the stud by the numeral 48, the same being surrounded by an anti-friction bearing 49 of any preferred form. The stud 48 is fixed in a nut 50, which is slidably mounted in the intermediate case between the members 27 and 28, movement being imparted thereto through the shaft 51 and worms 52 and 53. It is held with the proper frictional engagement against the inner face of the member 27 by a wedge 54 the ribs 55 of which bear upon the inner face of the member 28, the endwise position of this wedge is adjusted through manipulation of the screws 56, which are threaded through the member 28 and impinge against the opposite ends of said wedge. This latter adjustment provides means for taking up the wear upon the parts.

The shaft 51 is journaled in packing glands 57 which are connected with the intermediate case and to always insure a proper engagement of the worms 52 and 53 with the nut 50 the worm 53 is slidably mounted upon said shaft 51. In case of wear, lost motion is taken up by manipulation of the upper gland 57 which will shift the position of the shaft 51 and worm 52, while the worm 53 will be moved along the shaft. This endwise movement of the worm 53 is possible through the fact that the shaft 51 is journaled in the lower gland 57.

My mechanism as a unit is secured to a fixed part by a standard 58, which is connected with the device through the bolts (not shown) that pass through the two cases and the intermediate case. The use of standard 58 is merely one of many methods provided for securing my device in position, and it is obvious that the shape of the standard may also be very materially changed so as to accommodate the mechanisms to structures of varying character to which my invention may be adapted. In each of the members 27 and 28, and registering with each other, are the ports 59 and 60, both of said ports being of substantially the same shape as the ports 9 and 10 and perform substantially the same function.

In operation, the cases 25 and 26 and the intermediate case are filled with a fluid, so that all of the parts operate therein, this fluid serving not only as a medium by which motion is transmitted, but also as a lubricant. As shown in Fig. 4, the shaft 29 is the driving shaft and the floating plate 46 connected therewith and the parts adjacent thereto, operate in the same manner as the plate 3 and parts connected therewith, as above described, the liquid, however, being forced through the port 60 and by such motion operating the sliding plate 45 and through it rotating the shaft 30 in substantially the same manner as the shaft 2 is rotated when the device shown in Figs. 1 to 3 inclusive is used as a motor. As the stud 48 is fixed in the nut 50, the relative position of the axis thereof with that of the axis of the shaft 29 may be varied by simply rotating the shaft 51, which also varies the length of stroke of the sliding plate 46, and by reason thereof the rate of speed of the shaft 30 is varied in proportion. If the axes of the stud 48 and shaft 29 are coincident no motion whatever is transferred to the shaft 30. When the parts are in these relative positions, the shaft 30 is locked against movement, the fluid serving as a brake or a check against the rotation of said shaft in either direction. Continuing the movement of the stud 48 so that its relative position in relation to the shaft 29 is upon the side opposite to that shown in Fig. 4, the direction of rotation of the shaft 30 will be reversed. It will therefore be noted that the mechanism may be utilized to transmit motion at variable speeds in opposite directions, as well as for a brake to prevent the transmission of motion. When the axes of the stud 48 and shaft 29 are coincident the motor connected with shaft 29 may be started without the employment of a clutch, so that with my mechanism there is no need of a clutch for connecting the prime mover with the transmission mechanism.

I have provided means for relieving the pressure between the ports 59 and 60 if they should at any time by the operation of the device under certain conditions become excessive in one of said ports. This mechanism relieves the pressure when it arrives at a predetermined pressure and allows the same to equalize with the pressure in the other port. This mechanism comprises the valves 61 and 62, which rest upon valve seats 63 and 64 and are normally held against said seats by springs 65 and 66, the tension of which is adjustable by hollow screws 67 which are held against accidental movement by jam nuts 68. An opening 70 is formed in one end of said valves and the same is connected with the exterior thereof through the lateral openings 69. With the parts as above described and the shaft 29 rotating in the direction shown by the arrow in Fig. 5, the port 60 will be the low pressure port and port 59 the high pressure port. If the pressure in port 59 should go above a predetermined pressure the valve 62 is forced off its seat and the fluid passes therethrough into the low pressure port, thus neutralizing the pressure. Immediately after the neutralization of the pressures, the spring 66 returns the valve to its seat. Excessive pressure is only liable to be created when the shaft 30 is being driven and the stud 48 is moved so that its axis is coincident with the shaft 29, in which case the inertia of the moving parts connected with the shaft 30 would be sufficient to temporarily create an excessive pressure in the port 59. Upon a reverse motion of the parts, and under unusual conditions, it is possible that such an excessive pressure might exist in the low pressure port 60, in which case the valve 63 would operate in exactly the same manner as the valve 62 to neutralize the pressure between the ports.

In practice it is somewhat difficult to construct mechanism so that the axes of two separate, independent, rotary bodies will be exactly coincident with each other, that is, they are in theory but in practice there is a slight variation. This variation is sufficient to create a pressure in the port 59, and to neutralize this so that there will be no motion whatsoever transmitted to the driven shaft 30, the ports are connected by moving the valve 63 off its seat. This is accomplished through the rod 71 that is slidably mounted within a screw 72 having a packing gland 73 upon its outer end. It is apparent that so long as the valve seat 63 is held off its seat the liquid will pass from one port to the other under a neutral pressure without transmitting motion.

There are minor changes and alterations that can be made within my invention, aside from those herein suggested, and I would therefore have it understood, that I do not limit myself to the exact construction herein shown and described, but claim all that falls fairly within the spirit and scope of the appended claims.

Having described my invention, what I claim as new and desire to secure by Letters Patent, is:—

1. In an apparatus of the character described, the combination with a casing having ports therein; of a member rotatably mounted within said casing; a second member eccentric to said rotary member; and an independent non-piston member having an operative connection with said rotary and eccentric members.

2. In an apparatus of the character described, the combination with a casing having ports therein; of a rotary member; an angular member connected with said case eccentric to said rotary member; and an independent member having an operative engagement with said rotary and eccentric members and during its movement covering and uncovering said ports.

3. In an apparatus of the character described, the combination with a casing having ports therein; of a rotary member mounted within said casing; a non-piston member connected with said rotary member so as to rotate therewith; and means for imparting a sliding movement to said non-piston member in relation to said rotary member during the rotation thereof.

4. In an apparatus of the character described, the combination with a casing having ports therein; of a rotary member mounted within said casing; a non-piston member connected with said rotary member so as to rotate therewith; and means for imparting a sliding movement to said non-piston member in relation to said rotary member during the rotation thereof, said means comprising a member fixed eccentric to the said rotary member.

5. In an apparatus of the character described, the combination with a casing having ports therein; of a rotary member within said casing; a plate connected with said member so as to slide in relation thereto and be rotated therewith and during said movement covering and uncovering said ports; and a member connected with said casing eccentric to said rotary member and having an operative connection with said plate.

6. In an apparatus of the character described, the combination with a case having port holes therein; of a rotary member within said casing; a plate having openings therein, connected with said rotary member so as to have a sliding movement thereon during the rotation thereof and during said movement said openings successively covering and uncovering said ports; and a member connected with said casing eccentric to said rotary member and having an operative engagement with said plate.

7. In an apparatus of the character described, the combination with a casing having ports therein; a rotary member within said casing; means for transmitting fluid from one of said ports to the other, said means comprising a member connected with said casing eccentric to said rotary member; and an element having openings therein connected with said rotary member so as to rotate therewith and with said eccentrically mounted member so as to have a sliding movement upon the rotary member during its rotation.

8. In an apparatus of the character described, the combination with a casing having ports therein; of a rotary member; a plate member with a plurality of openings therein having an operative connection with said rotary member so as to rotate therewith; a member connected with said case eccentric to said rotary member and having an operative engagement with said plate member, said plate member during its movement, by reason of its operative connection with said rotary member and eccentric member, increasing and decreasing the relative capacity of said openings as the same successively cover and uncover said ports.

9. In an apparatus of the character described, the combination with a casing having ports therein; of a rotary member having a flat face at one end; a plate with openings therein slidable on said flat face and rotatable with said rotary member; and a member connected with said casing eccentric to said rotary member and projecting into one of the openings in said plate.

10. In an apparatus of the character described, the combination with a casing having ports therein; of a rotary member having a flat face at one end with lugs thereon; a plate with openings therein slidable on said flat face and rotatable with said rotary member, some of said openings registering with said lugs; and a member connected with said casing eccentric to said rotary member and projecting into one of the openings in said plate.

11. In an apparatus of the character described, the combination with a casing having ports therein; of a rotary member having a flat face at one end with lugs thereon; a plate with openings therein slidable on said flat face and rotatable with said rotary member, some of said openings registering with said lugs; and a member connected with said casing eccentric to said rotary member and projecting into one of the openings in said plate, the arrangement of said openings, lugs and eccentric member being such that during the movement of said plate the open space between the end of said openings and the lug or the eccentric member varies in size.

12. In an apparatus of the character described, the combination with a casing having ports therein; of a rotary member having a flat face at one end with lugs thereon; a plate with openings therein slidable on said flat face and rotatable with said rotary member, some of said openings registering with said lugs; and a member connected with said casing eccentric to said rotary member and projecting into one of the openings in said plate, the arrangement of said openings, lugs and eccentric member being such that during the movement of said plate the open space between the end of said openings and the lug or the eccentric member therein both increases and decreases in size during a complete revolution thereof.

13. In an apparatus of the character described, the combination with a casing having ports therein; of a rotary member having a flat face at one end with lugs thereon; a plate with openings therein slidable on said flat face and rotatable with said rotary member, some of said openings registering with said lugs; and a member connected with said casing eccentric to said rotary member and projecting into one of the openings in said plate, the arrangement of said openings, lugs and eccentric member being such that during the movement of said plate the open space between the end of said openings and the lug or the eccentric member therein pass over said ports and take in fluid from one of said ports and convey it over the end of said rotary member and discharge it through the other port.

14. In an apparatus of the character described, the combination with a casing having ports therein; of a rotary member within said casing; a member occupying an eccentric relation with the axis of said rotary member; a floating member connected therewith having openings therein; and radially expansible chambers passing over said ports, said chambers being formed within said openings, said casing and rotary member forming sides thereof.

15. In an apparatus of the character described, the combination with a casing having ports therein; a driven element; a driving element; a member connected with each of said elements and eccentric thereto; a plate having a floating engagement with each of said elements and eccentric member, and during its movement covering and uncovering said ports; and means for mounting one of said eccentric members so that the same may be moved to a position concentric to the member with which it is connected.

16. In an apparatus of the character described, the combination with a casing having ports therein; of a driving element; a driven element; a floating member having radial openings therein connected with each of said elements and during its rotation covering and uncovering said ports; a member connected with said casing and eccentric to one of said elements; an operative connection therebetween; a second eccentric member having an operative engagement with the other of said elements; and means for moving said latter eccentric member thereof so that the axis thereof will be coincident with the axis of rotation of the element with which it is connected.

17. In an apparatus of the character described, the combination with companion casings; of a rotary member in each of said casings; a plate in each of said casings having a floating engagement with the rotary member therein; an intermediate case between said casings having ports therethrough connecting each of said casings; a member projecting into each of said casings eccentric to said rotary member; and a relief valve for equalizing the pressure within both of said casings.

In testimony whereof I affix my signature in presence of two witnesses.

JULIAN A. GILES.

Witnesses:
 GEORGE E. HALL,
 FLORENCE H. MONK.